June 13, 1972 H. UMBACH ETAL 3,669,580
APPARATUS FOR MAINTAINING THE INTERNAL AIR PRESSURE
DURING THE PRODUCTION OF SIZED PLASTIC PIPE
Filed Aug. 29, 1969
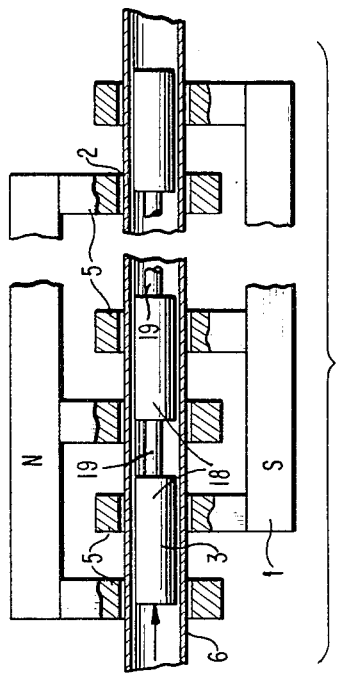
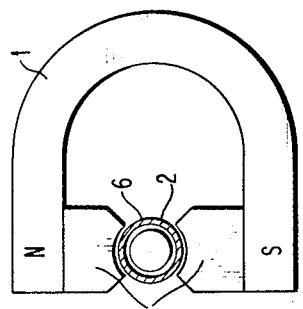
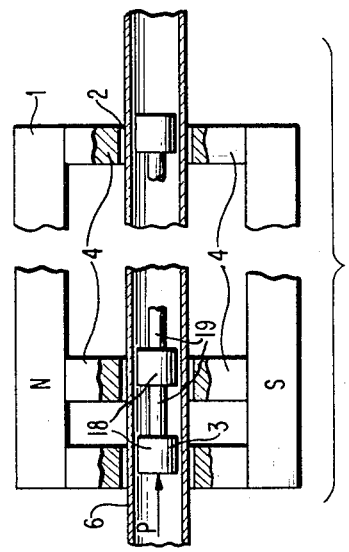
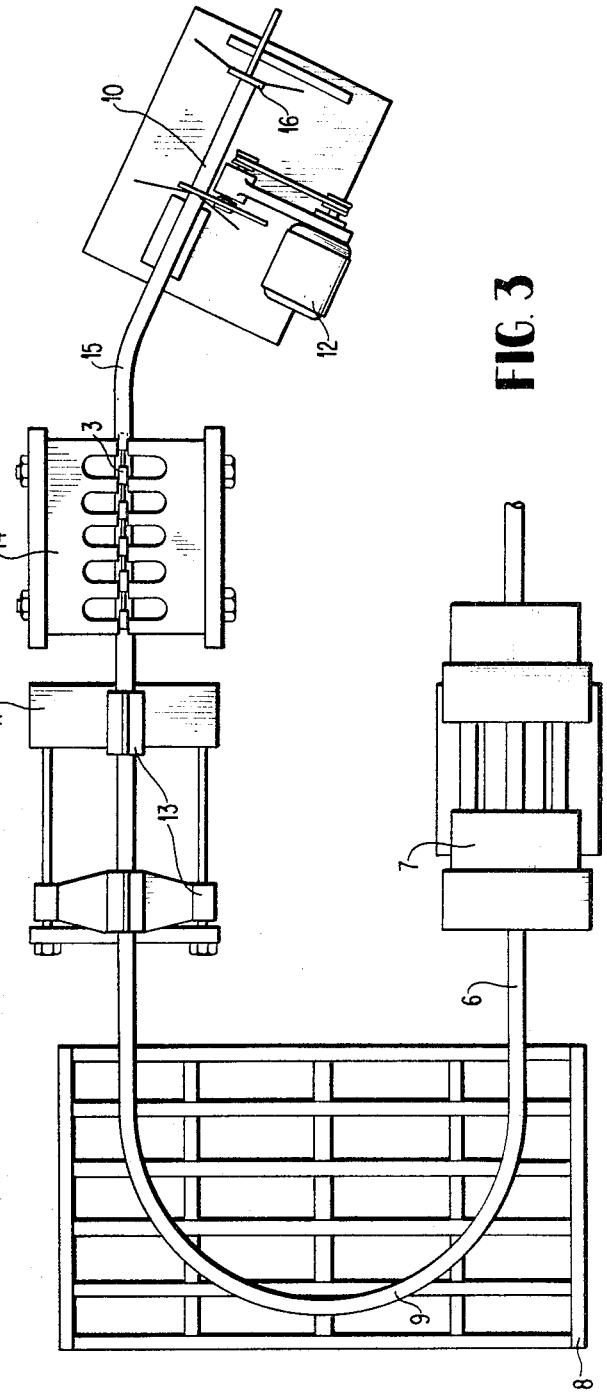
INVENTORS
HANS UMBACH
HANS JENA
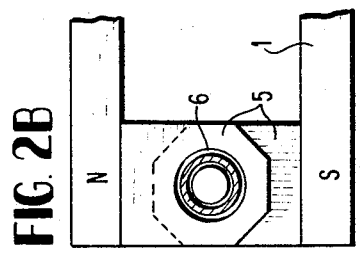
ATTORNEYS

United States Patent Office 3,669,580
Patented June 13, 1972

3,669,580
APPARATUS FOR MAINTAINING THE INTERNAL AIR PRESSURE DURING THE PRODUCTION OF SIZED PLASTIC PIPE
Hans Umbach, Stadeln, and Hans Jena, Nuremberg, Germany, assignors to Dynamit Nobel AG, Troisdorf, Germany
Filed Aug. 29, 1969, Ser. No. 854,224
Int. Cl. B29d 23/00
U.S. Cl. 425—3            12 Claims

ABSTRACT OF THE DISCLOSURE

A device for maintaining the internal air pressure during the manufacture of a sized synthetic polymer pipe by providing a ferromagnetic sealing stopper disposed in the interior of the pipe and a magnetic field for holding the stopper in a relatively fixed position. To yield sufficient holding force, the sealing stopper has portions of reduced cross-sectional area between portions of expanded cross-sectional area.

BACKGROUND OF THE INVENTION

As is known, during the manufacture of sized plastics pipe, an internal air pressure of about 4 atmospheres gauge is required in the pipe. This air is maintained under pressure by pinching off (clamping) the end of the pipe. During the manufacturing process, the pipe which is under said internal pressure can be relieved of this pressure only by pinching it off in sections and can only thereafter be further processed. It is well known that tube lengths of about 5 m. are produced in this manner, which lengths are thereafter divided into pipe sections of about 70 mm. in length, for example, for shot cartridges. However, clamping points or marks are present in the 5 m. lengths of pipe which must be found during the cutting-up procedure and rejected.

SUMMARY OF THE INVENTION

An object of the present invention is to overcome the above-mentioned disadvantages and provide an apparatus making it possible to process sized plastic or synthetic polymeric pipe continuously and wherein no rejects are produced during the further processing of said pipe into smaller pipe lengths.

Other objects and further scope of applicability of the present invention will become apparent from the detailed description given hereinafter; it should be understood, however, that the detailed description has specific examples, while indicating preferred embodiments of the invention, are given by way of illustration only, since various changes and modifications within the spirit and scope of the invention will become apparent to those skilled in the art from this detailed description.

Pursuant to the present invention, it has been found that the above-mentioned disadvantages may be eliminated and a much improved apparatus for producing synthetic polymer pipe may be obtained by introducing into the open end of the plastic pipe a rod-type ferromagnetic sealing stopper and maintaining the latter in position by means of a magnetic field. The total force of the holding magnet can also be produced by the combination of individual forces. In any event, such holding force must be sufficient to retain the sealing stopper in the interior of the plastic pipe against the internal supporting pressure and the friction of the pipe being pushed over the stopper. A safety bend or arc consisting of a curvature of the guide means for the plastic pipe prevents the sealing stopper from bursting out of the pipe during excess pressure or when the magnetic field becomes inoperative. By combining the apparatus of the present invention with a stepwise feeding device or pipe take-off device and a shearing device, into one structural unit, it is possible to cut the plastic pipe into various sized sections without the production of rejects.

BRIEF DESCRIPTION OF THE DRAWINGS

The present invention will become more fully understood from the detailed description given hereinbelow and the accompanying drawings which are given by way of illustration only and thus are not limitative of the present invention and wherein, FIG. 1 is a magnetic sealing stopper retaining device with a magnetic flux at right angles to the axis of the pipe;

FIG. 2 shows a magnetic sealing stopper retaining device with a magnetic flux extending longitudinally with respect to the axis of the pipe; and FIG. 3 is a unit assembly for cutting plastic pipe to specific lengths incorporating the inventive features of the present application.

DESCRIPTION OF THE PREFERRED EMBODIMENTS

Referring now to the drawings, wherein like reference numerals are used through the various views to designate like parts, the apparatus according to FIGS. 1 and 2 shows the construction of the sealing stopper holding (retaining) device of the present invention. When designing the holding magnet (or master magnet) 1, the unavoidably large air gap 2 and the small diameter of the ferromagnetic sealing stopper 3 must be correspondingly taken into consideration in order to obtain the necessary holding force P required. In FIG. 1, a subdivision of the magnetic field at right angles to the direction of force of the holding force P is illustrated, wherein the desired magnitude of the holding force P is obtained by the addition of several individual forces. This is attained by an appropriate number of oppositely disposed pole shoes 4. The holding force P can also be produced by means of a magnetic field extending in the direction of the pipe axis. In this instance, several individual magnetic fields are combined, which are produced by the special construction of the pole shoes 5, that is, the pole shoes extend around the plastic pipe 6 and are offset with respect to one another.

As illustrated in both FIGS. 1 and 2, an essential characteristic of the present invention is the use of a ferromagnetic sealing stopper having reduced cross-sectional portions 19 disposed between expanded portions 18. By experimentation, it has been found that the holding force for maintaining the ferromagnetic sealing stopper in position is a function of the distortion of the lines of force of the magnetc field emanating between the oppositely disposed pole shoes 4. When the ferromagnetic sealing stopper 3 is displaced, only the lines of force adjacent the end of the sealing stopper are distorted. The remaining lines of force extend linearly between the oppositely disposed pole shoes 4. Thus, it is apparent that the holding force depends upon the number of ends (or expanded portions) of the sealing stopper. Accordingly, the sealing stoppers of the present invention have been provided with the aforementioned reduced portions 19. Preferably, the reduced portions are of a length equal to the distance between consecutive pairs of magnetic poles while the expanded portions are of a length equal to the width of the poles as shown in FIG. 1 or the reverse as shown in FIG. 2.

The structural unit shown in FIG. 3 schematically shows a part of a pipe sizing device including the last pipe take-off unit 7 and the supporting grid 8 for the compensating loop 9 of the plastic pipe 6. The compensating loop is required in order to convert the continuous production of the plastic pipe in the sizing device into a stepwise processing during the shearing of the pipe section 10. The stepwise feeding device 11 is controlled in synchronism with the shearing devices 12, the plastic pipe 6 being held, in each case, by one of the two clamping jaws 13. The sealing stopper holding device 14 of the present invention is disposed therebehind. The safety bend 15 consisting of a curvature in the guide means 17 for the plastic pipe prevents the sealing stopper 3 from shooting out of the plastic pipe 6 during a malfunction of the plant. Guide means 17 should be constructed to permit reliable guiding of tube 6 without undue friction. I the shearing device 12, which can be designed for single of multiple cutting, as required, the operations of shearing and feeding are controlled by way of the pipe abutment (stop) 16 utilizing a sequence control device.

The invention being thus described, it will be obvious that the same may be varied in many ways. Such variations are not to be regarded as a departure from the spirit and scope of the invention, and all such modifications as would be apparent to one skilled in the art are intended to be included.

We claim:

1. A device for maintaining the internal air pressure during the manufacture of a sized synthetic polymer pipe which comprises at least one ferromagnetic sealing stopper adapted to be disposed inside the pipe by being introduced through the open end thereof, said ferromagnetic sealing stopper having at least two expanded portions of cross-sectional area corresponding to the internal area of said pipe and at least one portion of reduced cross-sectional area positioned therebetween, and a plurality of pairs of holding magnets, each pair having opposite magnetic poles adapted to respectively subject each of said expanded portions of said sealing stopper to holding forces.

2. The device of claim 1 wherein the total holding force of the holding magnets is the combination of individual holding forces of each of said holding magnets.

3. In an apparatus for the manufacture of a sized synthetic polymer pipe wherein said pipe is subjected to internal air pressure, said apparatus including a device for maintaining said internal air pressure comprising at least one ferromagnetic sealing stopper adapted to be disposed inside said pipe, said sealing stopper having at least two expanded portions of cross-sectional area corresponding to the internal area of said pipe and at least one portion of reduced cross-sectional area positioned therebetween, and a plurality of pairs of holding magnets, each pair having opposite magnetic poles adapted to respectively subject each of said expanded portions of said sealing stopper to holding forces.

4. The device of claim 3 wherein guide means are provided for guiding the pipe during its manufacture, said guide means containing a curvature which prevents the sealing stopper from bursting out of the pipe during an excessive pressure or when the magnetic field becomes inoperative.

5. The device of claim 3 wherein said device is combined with a stepwise pipe feeding means and a shearing means to form an apparatus for manufacturing sized pipe.

6. The device of claim 1 wherein the holding magnets are disposed such that the magnetic field is at right angles to the axis of the pipe.

7. The device of claim 1 wherein the holding magnets are disposed such that the magnetic field extends in the same direction as the axis of the pipe.

8. The device of claim 7 wherein the holding magnets comprise a plurality of pole shoes of a master magnet which are adapted to extend around the pipe and are offset with respect to each other.

9. The device of claim 5 wherein a supporting grid is disposed before the pipe feeding means.

10. The device of claim 9 wherein clamping jaws for holding the pipe are provided in front of the device for maintaining the internal pressure and guide means are provided after said device for maintaining the internal pressure, said guide means containing a curvature which prevents the sealing stopper from bursting out of the pipe during excessive pressure or when the magnetic field becomes inoperative.

11. The device of claim 8 wherein the expanded portions of said sealing plug are of a length equal to the width of each of said pole shoes and said reduced portions of said sealing plug are of a length equal to the distance between consecutive pole shoes.

12. The apparatus of claim 3 wherein the holding magnets comprise a plurality of pole shoes of a master magnet and adapted to extend around said pipe and arranged along the length thereof, said expanded portions of said sealing plug having a length equal to the width of each of said pole shoes and said reduced portions of said sealing plug having a length equal to the distance between consecutive pole shoes.

References Cited

UNITED STATES PATENTS

| | | | |
|---|---|---|---|
| 2,491,589 | 12/1949 | Slaughter | 18—14 A |
| 2,903,743 | 9/1959 | Lysobey | 18—14 A X |
| 2,377,908 | 6/1945 | Slaughter | 18—DIG. 33 UX |
| 2,903,743 | 9/1959 | Lysobey | 18—14 A X |
| 3,341,637 | 9/1967 | Nicholson | 18—14 A X |
| 2,377,908 | 6/1945 | Slaughter | 18—DIG. 33 UX |

ROBERT L. SPICER, Jr., Primary Examiner

U.S. Cl. X.R.

425—387